UNITED STATES PATENT OFFICE.

JAMES HARRY CLARK, OF DETROIT, MICHIGAN.

VEHICLE WHEEL.

1,421,128.   Specification of Letters Patent.   Patented June 27, 1922.

Application filed September 30, 1921. Serial No. 504,487.

*To all whom it may concern:*

Be it known that I, JAMES HARRY CLARK, a citizen of the United States of America, residing at Detroit, in the county of Wayne and State of Michigan, have invented certain new and useful Improvements in Vehicle Wheels, of which the following is a specification, reference being had therein to the accompanying drawings.

This invention relates to vehicle wheels, and more particularly to wheels for tractors or the like, It is the object of the invention to provide an improved reinforcement for a joint between two metallic elements of a vehicle wheel, and more particularly for the joint between a metal spoke and the wheel rim.

In the drawings:—

Figure 1 is a fragmentary side view of a wheel employing the improved reinforcement.

Figure 2 is a radial section taken on line 2—2 of Figure 1.

Figure 3 is a radial sectional view of a modified construction of wheel.

Figure 4 is a fragmentary side view of a rim for a tractor wheel or the like, to which an auxiliary rim is secured by means employing the improved reinforcement.

Figure 5 is a cross section view of the device taken on line 5—5 of Figure 4.

Figure 6 is a plan view of the same.

In these views the reference characters A, B, and C designate respectively the hub spokes and rim of a tractor wheel, the spokes having the nature of metal straps, and the rim being of channel shape with inturned flanges. Preferably the alternate spokes are crossed as best shown in Figure 2, the inner end of said spokes being cast into lugs D formed integral with the hub. To increase their retention in the hub, said spokes are formed at their inner ends with apertures E into which the metal of the hub flows. The hub is offset somewhat to one side of the center line of the rim (see Figure 2). The outer ends of the spokes B which approach that side of the rim toward which the hub is offset are bent parallel to the flange of the rim at said side, and interiorly engage said flange, being riveted thereto as indicated at F. Preferably also short end portions of said spokes are bent, as shown in Figure 2, into interior engagement with the body portion of the rim C, as indicated at F'. The alternating spokes have their outer end portions doubled as indicated at G, the doubled end portions being intermediately bent so as to extend, beyond the bend, in parallel interior engagement with the body of the rim C to which body the spokes are secured by rivets H passing through both plies of the doubled portion. Also said plies are riveted to each other as indicated at 1, inwardly of the intermediate bend. Thus it is seen that the joint between the doubled spokes and the rim is very strongly reinforced so as to fully insure against any relative movement of the joined parts as well as adequately taking care of any possible torsional stresses.

In the modification disclosed in Figure 3, the hub, spokes, and rim, are indicated respectively at A', B', and C'. In this construction all of the spokes have their inner end portions lying in the central plane of impact of the wheel and cast into a flange M, formed integral with the hub. The alternate spokes are inclined to opposite sides of the wheel as they extend outwardly, being secured to the respective inturned flanges of the channel-shaped rim C'. Said flanges are interiorly engaged by the outer end portions of the spokes, said end portions being doubled and being intermediately bent so as to have the direction of the main body of the spokes inwardly of the bend, and to lie parallel to the flanges of the rim outwardly of the bend. Rivets K rigidly engage the doubled portions of the spokes with the flanges of the rim and the two plies of the doubled portions are furthermore riveted to each other as indicated at L, inwardly of the intermediate bend. Thus it is seen that in this construction all of the spokes are strongly reinforced at the point of connection to the rim.

In the construction shown in Figures 4, 5 and 6, N designates the channel-shaped permanent rim of a vehicle wheel which rim is externally cleated as indicated at O, and P is a channel-shaped auxiliary rim which is attachable concentrically to the permanent rim to provide a tread surface covering the cleats. Attachment of said auxiliary rim to the permanent rim is effected by a plurality of spoke elements or legs Q, riveted as indicated at R alternately to the respective flanges of the auxiliary rim and diverging slightly as they extend inwardly. The inner end portions of said spoke members are doubled as indicated at S, the portions S being intermediately bent, the two plies thus formed being parallel and seated upon the permanent rim N, inwardly of the intermediate bend and detachably secured to said rim by bolts U. Said plies are further riveted to each other as indicated at T outwardly of the intermediate bend. Thus the spoke members which mount the auxiliary rim upon the permanent rim are strongly reinforced at their point of attachment to the latter.

In each of the described modifications of the invention a spoke or like element is connected to the metallic rim of a tractor or like wheel and by simply doubling said spoke adjacent to its connection to the rim a strong reinforcement is effected. The rigid attachment of the two plies of the doubled portion of the spokes to each other independently of the connection of said plies to the rim member is important in maintaining the efficiency of the reinforcement, since the doubled plies are thus securely held in a constant opposed relation which may not be disturbed by the severe strains encountered by the wheel in its use. If any variation were permitted in the opposed relation of the said two plies this would tend to destroy registration of the apertures engaged by the rivets H or K or by the bolts U and thus subject said rivets or bolts to a shearing stress.

What I claim as my invention is:

1. A vehicle wheel comprising a rim and a member having a return-bent portion contiguous with said rim and means rigidly securing both plies of the return-bent portion rigidly to the rim.

2. A vehicle wheel comprising a rim and a spoke and having doubled outer portion engaging said rim, means rigidly connecting both plies of said doubled portion to the rim and means extending through and rigidly connecting both of said plies to each other.

3. A vehicle wheel comprising a rim, a spoke member having a doubled end portion engaging said rim, said doubled portion being formed with an intermediate bend, means at one side of said intermediate bend rigidly securing the doubled portion to the rim and means at the other side of said bend rigidly securing the two plies of the doubled portion to each other.

4. A vehicle wheel comprising a rim and a spoke member angularly approaching said rim and having a doubled end portion intermediately bent to terminally extend in parallel engagement with the rim, means rigidly securing said terminal portion to the rim and independent means rigidly connecting the two plies of the doubled end portion.

In testimony whereof I affix my signature.

JAMES HARRY CLARK.